UNITED STATES PATENT OFFICE.

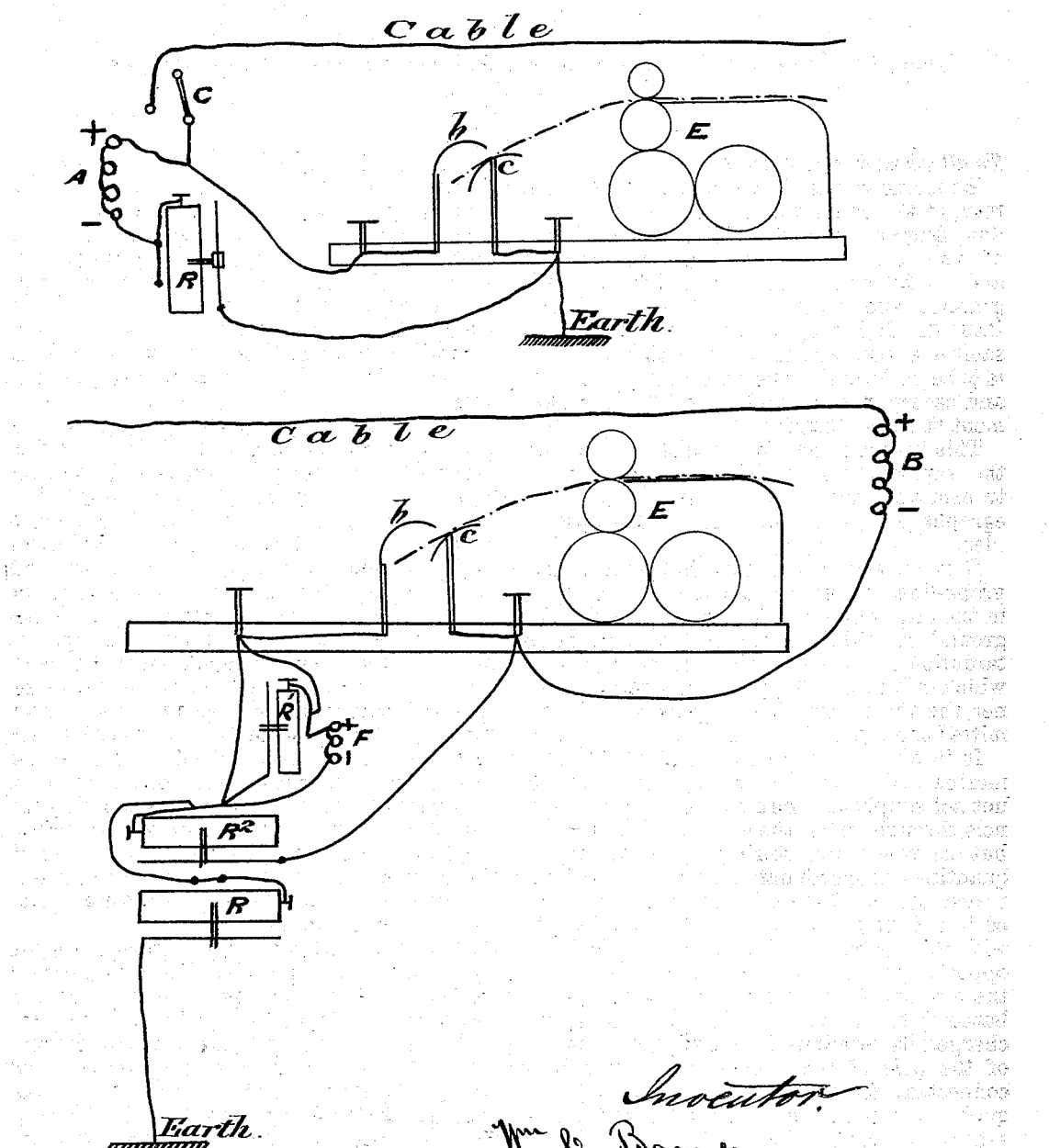

WILLIAM C. BARNEY, OF LONDON, ENGLAND.

IMPROVEMENT IN ELECTRIC TELEGRAPHS.

Specification forming part of Letters Patent No. 154,002, dated August 11, 1874; application filed January 21, 1874.

*To all whom it may concern:*

Be it known that I, WILLIAM CHASE BARNEY, of 41 Lombard street, in the city of London, England, a citizen of the United States of America, have invented or discovered new and useful Improvements in Electric Telegraphs; and I, the said WILLIAM CHASE BARNEY, do hereby declare the nature of the said invention, and in what manner the same is to be performed, to be particularly described and ascertained in and by the following statement thereof—that is to say:

This invention has for its object to increase the rapidity with which messages may be transmitted through long lines of electric telegraphs, and more especially by deep-sea cables.

It is an established fact that in long telegraph-lines, whether of naked wires suspended in the air, or of insulated wires placed under ground or under water, there is a great retardation of the current caused by induction, which induction affects, in a very serious manner, the speed with which signals can be transmitted through long lines.

It is also now well known, first, that submarine and subterranean insulated wires do not act simply as conductors, or as mere channels through which the electric current flows, but as reservoirs, storing up electricity in quantities proportionate to the length of the wires; second, that an insulated line connected to one pole of a battery becomes charged with the electricity of that pole, provided the opposite pole be connected to the earth, and the wire attains the same static tension as the battery; third, that in an insulated line thus charged its terminus is actually the terminus of the pole of the battery with which it is connected; fourth, that the earth may be regarded as presenting no resistance to the passage of an electric current.

By my invention I am enabled to avail myself of all the above well-established facts, and to construct an electric telegraph by which signals can be transmitted with perfect accuracy, at a very high rate of speed, between stations connected by any length of insulated wire which can be charged by a battery. For this purpose the end of the insulated wire at the place at which the signals are to be received is connected to the copper pole of a battery, and the other end of the insulated wire is connected to the transmitting-instrument, and at the transmitting end a second battery is placed, having its copper pole connected to the insulated line, and its zinc pole is connected to the line which leads to the earth from the plate of the transmitting-instrument, upon which plate contacts are made by the stylus, which is connected to the insulated line.

At the receiving-station, in chemical telegraphs, where the recording-stylus rests constantly on the chemically-prepared paper, the insulated line is connected to the copper pole of the battery, and the zinc pole is connected to that part of the instrument over which the chemically-prepared paper is drawn, and the recording metallic stylus is connected to the earth; but when the recording-stylus is not allowed to remain constantly on the paper, and successive contacts regulated by the transmitter are to be made by it by the use of relays and magnets, then the relays and magnets are to be connected to the insulated line and earth in the same manner, and a second battery, if in chemical telegraphs, is to be on short circuit, with its copper pole to the stylus, and its zinc pole to that part of the instrument over which the paper is drawn on which the signals transmitted are to be recorded. The connections of the several batteries may be reversed throughout.

By this arrangement the signals are made by the transmitting-instrument at the end of the insulated wire or cable, which is the terminus of the copper pole of the first battery, and they pass to the earth, and a current leaves the earth at the receiving-station and passes to the receiving-instrument, and, through it, to the zinc pole of the battery. Thus all the evil effects of induction are avoided, as it is evident none of the signals pass over the insulated wire.

The transmitting and receiving instruments which I employ are arranged on the well-known Bains system. In the transmitting-instrument the making and breaking contact between the terminus of the copper pole of the battery and the earth is effected by a strip of perforated paper interposed between two metal conductors, and caused to travel between them; and in the receiving-instrument the currents received are caused to pass through chemically-prepared paper interposed between two metal conductors.

The current which enters the earth at the transmitting-station is from the copper pole, and a current of electricity leaves the earth at the receiving-station and passes to the receiving-instrument, and through the prepared paper thereon to the zinc pole of the battery, marking the paper in its passage. These connections of batteries with cable, earth, resistance, coils, transmitter, and receiver, can be applied to all telegraphic instruments; the speed of transmission in all cases is limited only by the rapidity of the instruments used to make the contacts.

The annexed diagram shows the arrangement I prefer for automatic chemical telegraphs. At the transmitting-station the copper pole of a battery, A, is connected to the wire brush $b$; the zinc pole is connected to the metallic plate $c$, over which the perforated paper is drawn by clock-movement E, or by any other power. An adjustable rheostat, R, is placed on the line between the zinc pole and metallic plate; the metallic plate is connected to earth; the copper pole and wire brush are connected to the cable by the commutator C. When the brush $b$ makes contact on $c$ through a hole in the perforated paper, battery A is on short circuit but when the cable is connected at C to battery A, then the copper current of A, when contact is interrupted between $b$ and $c$ by the paper, passes into the cable, and this counter current arrests the flow of the current from the first battery, thereby assisting in causing the marks to commence and cease abruptly without tailing.

At the receiving-station the copper pole of a battery, B, is connected to the cable, and the zinc pole to the plate $c$, over which the chemically-prepared paper is drawn, upon which the stylus $b$ makes contact. The earth-line D is connected to an adjustable rheostat, R, and thence to the adjustable rheostat $R^2$, (shunt,) and thence to the stylus $b$.

At the transmitting-station the rheostat R is placed for the purpose of regulating the tension of battery A. At the receiving-station the current, passing from the earth by line D, is made to pass through the adjustable rheostat R, for the purpose of decreasing the tendency to the admission of false currents from the earth to the writing-stylus $b$. The resistance introduced must be graduated so as to overcome ordinary earth-currents, and the feeble current which always passes from the earth to the zinc pole of a battery, the positive pole of which is connected to a long insulated line, the end of which is free. The current from the line-battery B, which is sufficiently strong to overcome the resistance of rheostat R, passes to a second rheostat-shunt, $R^2$, by means of which the quantity of the current allowed to pass through the stylus to the prepared paper is regulated at will, and the flooding thereof is prevented, the surplus current passing directly to the zinc pole of battery B. I also use a battery, F, at the receiving-station, the copper pole of which is connected to the stylus $b$ through an adjustable rheostat-shunt, $R^3$, and the zinc pole is connected to the line connecting stylus $b$ to earth, for the purpose of aiding to cause the signal-marks on the paper to end abruptly and squarely.

The transmission of the signals, which are perforated on a band of paper, is effected in the following simple manner: The cable is connected at C to battery A and brush $b$; as the perforated paper is drawn over plate $c$, the brush $b$ makes contacts through the holes in the paper. Battery A is then in short circuit, and the current from the copper pole of battery B, the end of which pole is brush $b$, passes through the holes as successive contacts are made to earth. At the same time a current passes from the earth up the line D, through the rheostat, to stylus $b$, which is resting on the chemically-prepared paper, and in its passage decomposes the chemical solution of the paper, and leaves traces clear and distinct in exact proportion to the duration of the contacts at the transmitting-station.

Having now described the nature of my said invention, and the manner in which it is performed, I hereby claim as my invention—

1. The combination, with an insulated line having batteries at each terminal thereof, placed with their positive poles to said line, of the resistances R $R^2$, arranged between the receiving-instrument and the ground, substantially as and for the purpose set forth.

2. The combination, with the insulated line, as described, and resistances R $R^2$, of the additional resistance $R^1$ and battery F, arranged and operating substantially as set forth.

3. The combination, with an insulated line, of a battery having its positive pole coupled to the line at the transmitting end, and to the wire brush $b$, while the negative pole of the battery is coupled to the earth-line through resistance R, substantially as and for the purpose set forth.

W. C. BARNEY.

Witnesses:
G. F. WARREN,
WILMER M. HARRIS,
*Both of No. 17 Gracechurch street, London.*